Figure 1:
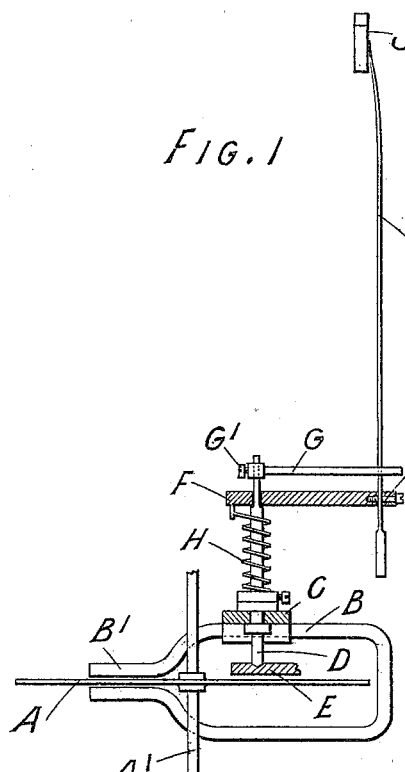

No. 643,392. Patented Feb. 13, 1900.
J. H. BARKER & J. A. EWING.
ELECTRIC METER.
(Application filed Aug. 14, 1899.)
(No Model.) 2 Sheets—Sheet 1.

Witnesses:
Harry M. Knight
Anna E. Lamb

Inventors:
John Henry Barker
James Alfred Ewing
By Knight Bros Attys

No. 643,392. Patented Feb. 13, 1900.
J. H. BARKER & J. A. EWING.
ELECTRIC METER.
(Application filed Aug. 14, 1899.)
(No Model.) 2 Sheets—Sheet 2.
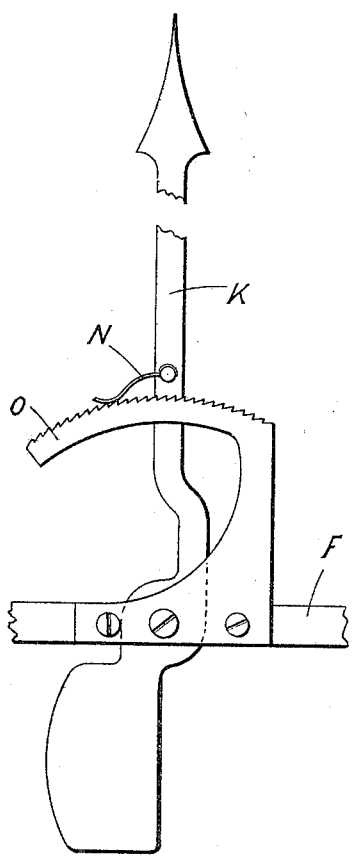
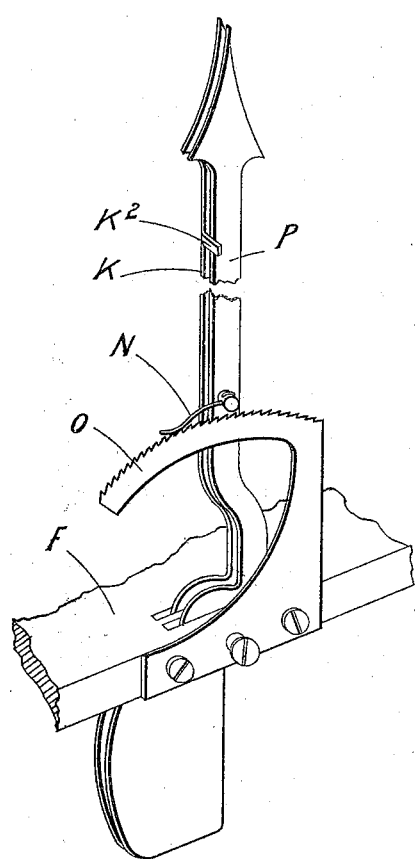

UNITED STATES PATENT OFFICE.

JOHN HENRY BARKER AND JAMES ALFRED EWING, OF CAMBRIDGE, ENGLAND.

ELECTRIC METER.

SPECIFICATION forming part of Letters Patent No. 643,392, dated February 13, 1900.

Application filed August 14, 1899. Serial No. 727,188. (No model.)

*To all whom it may concern:*

Be it known we, JOHN HENRY BARKER and JAMES ALFRED EWING, subjects of the Queen of England, residing at Cambridge, in the county of Cambridge, England, have invented certain new and useful Improvements in or Relating to Electric Meters, (for which we have made application for Letters Patent in Great Britain, No. 15,705, dated August 1, 1899,) of which the following is a specification.

Our invention relates to improvements in electric meters, and has special reference to apparatus incorporated in such meters for the purpose of indicating the maximum rate of supply of electric current or electric energy.

In certain well-known types of electric meters the rotation of a disk or other revolving conductor is opposed by the electromagnetic drag between it and a magnetic brake consisting of a fixed magnet or magnets in consequence of the eddy-currents which are generated in the conductor by such relative rotation.

In carrying out our invention we suspend or pivot the magnet or magnets in such a way that they are allowed to move through a small distance against a spring or other suitable controlling force. This motion is caused to actuate a pointer or other indicator which multiplies the small motion of the magnets and indicates the greatest drag between the magnets and the disk. We make the spring or other controlling force comparatively strong in order that the motion of the magnet-poles may be so small as not to affect the rate of the meter and also in order that the period of oscillation of the suspended system may be short. The advantage of this will be readily seen, for if a sudden increase in the rate of supply to the meter takes place the suspended magnetic brake would tend to swing beyond the position proper to the new rate of supply if its period of oscillation were not short in relation to the time taken by the revolving parts of the meter to acquire their new velocity. This tendency is obviated by making the period of the brake sufficiently short in relation to the time during which the disk is undergoing acceleration when a current is suddenly applied or suddenly increased. Further advantages of the strong controlling force, and consequently small movement of the brake, are that there is no necessity to provide a dash-pot or other means for checking the oscillations, although such means may be provided, if desired, and the magnet may be pivoted eccentrically to the disk. Again, the small motion of the magnets assists in preventing disturbance of the indications through the direct effect of the motor-coils in cases where continuous currents are used.

Figure 3:
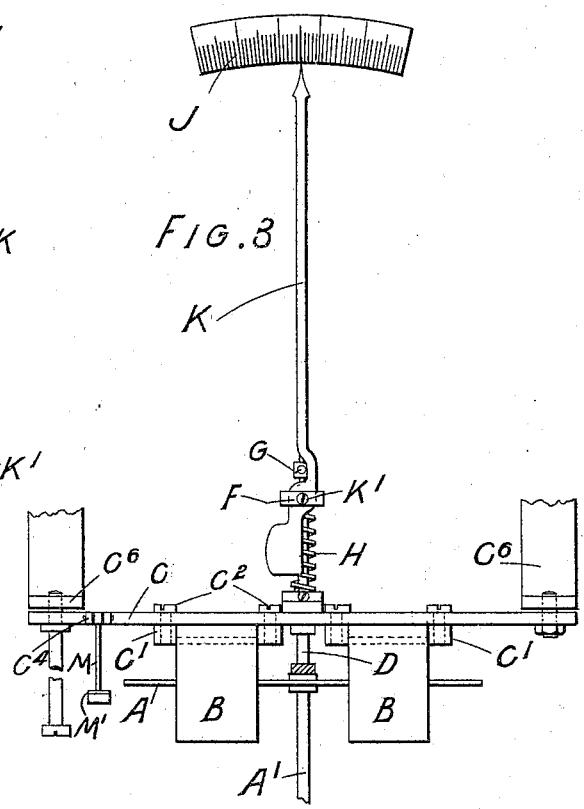
Figure 2:
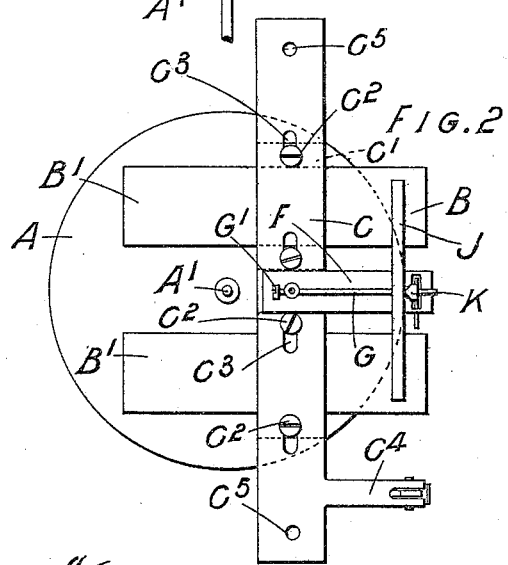
Figure 4:
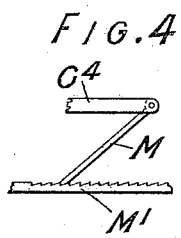

In the accompanying drawings, Figure 1 is a side elevation, partly in section, showing a portion of one construction of meter according to this invention. Fig. 2 is a plan. Fig. 3 is a front elevation of the same, parts being removed for the sake of clearness. Fig. 4 shows a detail of the device in elevation in a direction at right angles to Fig. 3. Fig. 5 is a side view illustrating a pawl and ratchet applied to the pointer K of Figs. 1 and 3; and Fig. 6 is a perspective view showing a similar pawl and ratchet applied to an auxiliary needle, which latter indicates maximum deflection only.

A is a disk of conducting material supported on the axle A' and revolving when the meter is in operation between the poles B' of magnets B. These magnets B are connected together by a frame or bridge-piece C, to which they are secured by clamps or stirrup-pieces C' or holes in the magnets and screws C². Slots C³ in the bridge-piece C allow for adjustment of the distance between the poles of the two magnets B. The magnets B are carried upon an axle D, which passes through the center of the bridge-piece C and is supported so that it is free to turn in the footstep bearing E and the bracket F. The parts E and F are attached to the frame of the instrument. The axle D carries an arm G, adjustably secured to it by a set-screw G'. The set-screw G' admits of an adjustment for zero and for the sensitiveness of the instrument. In place of adjusting by means of the set-screw the arms may be bent for this purpose. A spring H is provided to control the motion of the magnets when they turn, owing to the drag between them and the revolving disk A. The spring H may be arranged to relieve the footstep bearing E of the whole or a part of the weight of the magnets and is so strong that the magnets can only turn through a small angle. The extent to which the magnets B turn is indicated upon a scale J by a pointer K, pivoted, as at K', and operated by the arm G. In order that the extent of the greatest motion of the magnets may be recorded, we provide a light pawl or detent M, pivoted to an arm C$^4$, forming part of the frame or bridge-piece which carries the magnets. The free end of this pawl M passes over the finely-cut teeth of a rack M', attached to a portion of the frame of the instrument, and, as shown in Figs. 3 and 4, the magnets are kept in their position of greatest angular movement until the pawl M is disengaged from the rack M'.

In order that the oscillating system may be securely held and prevented from being damaged during transport, holes C$^5$ are made in the ends of the bridge-piece C, and through these holes screws are passed which screw into brackets C$^6$ on the frame of the instrument, thus lifting the magnets from their bearing at E and relieving the strain upon the spring H. In the drawings one screw is shown short and the other long, so that it can be turned from outside the case.

Although it is preferred to apply the pawl M and its ratchet M' to the whole oscillating system, as described, we may, if desired, apply it to the pointer only, so that the magnet is free to return when the drag diminishes, leaving the pointer in its position of maximum deflection. In such a case two pointers may be provided, one with a ratchet device and the other free to follow the movement of the magnet. Thus, as shown in Figs. 5 and 6, the face of the pointer K has secured to it one end of a light spring-pawl N, the other end of which bears upon a ratchet O, secured to the frame of the apparatus in proximity to the face of the pointer and formed on a circular arc whose center is the pivot about which the pointer K oscillates, or, as shown in Fig. 6, the pawl may be omitted from the pointer K and the latter provided with a projection K$^2$, bearing against one side of an auxiliary pointer P, which latter is provided with the spring-pawl N, bearing upon the ratchet O in manner and effect as described with reference to Fig. 5, so that the auxiliary pointer P will be moved in one direction only by the pointer K and will be held by its spring-ratchet at the farthest point to which it is moved and will thus indicate the maximum deflections only. Obviously the friction between the spring N and the curved metallic sector O could be such as to render unnecessary the use of teeth on the sector.

It is to be understood that the details of this meter may be varied without departing from the spirit of the invention, which may be applied to other types of electric meters, such as those in which the action depends upon an oscillating movement instead of a revolving motion. Again, although it is convenient to use two magnets coupled by a bridge-piece, as herein described, yet a single magnet or more than two magnets may, if desired, be used. Further, although it is preferred to pivot the revolving disk and the magnetic brake about parallel axes it is possible to pivot them so that their axes are coincident—say by arranging the magnet so that it is supported beneath the center of rotation of the disk.

We claim—

1. The combination in an electric meter of a revolving conductor, a pivoted or suspended magnetic brake and means to prevent excessive angular movement of the brake, substantially as and for the purpose set forth.

2. In an electric meter the combination of a pivoted or suspended magnetic brake comprising one or more magnets, a conductor moving in the magnetic field of the brake, means for controlling the motion of the brake, and an indicator for multiplying and exhibiting the amount of such motion, substantially as set forth.

3. In an electric meter the combination of a revolving conductor with a magnetic brake pivoted or suspended about an axis parallel to the axis of rotation of the conductor means for controlling the motion of the brake, and an indicator for multiplying and exhibiting the amount of such motion, substantially as set forth.

4. In an electric meter the combination of a pivoted magnetic system comprising a plurality of magnets connected by a bridge-piece, a conducting-disk revolving between the poles of the magnets about an axis parallel to the axis about which the magnetic system is pivoted, a spring controlling the motion of the magnets, a pointer for exhibiting in a multiplied form the amount of such motion, an adjustable arm secured to the axle bearing the magnets and operatively connecting such axle with the pointer, a pivoted pawl, and a fixed rack with which the pawl engages, substantially as and for the purpose set forth.

5. In an electric meter the combination with a pivoted magnetic brake of fixed supports, and means for clamping the magnetic brake to the supports for the purpose set forth.

In testimony whereof we have hereunto set our hands in the presence of the two subscribing witnesses.

JOHN HENRY BARKER.
JAMES ALFRED EWING.

Witnesses:
ALFRED J. BOULT,
HARRY B. BRIDGES.